United States Patent
Kormos

(10) Patent No.: US 7,227,515 B2
(45) Date of Patent: *Jun. 5, 2007

(54) SYSTEM AND METHOD FOR FORMING IMAGES FOR DISPLAY IN A VEHICLE

(75) Inventor: Alexander L. Kormos, Fairview, TX (US)

(73) Assignee: L-3 Communications Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/129,849

(22) Filed: May 16, 2005

(65) Prior Publication Data

US 2005/0206727 A1 Sep. 22, 2005

Related U.S. Application Data

(63) Continuation of application No. 09/972,543, filed on Oct. 8, 2001, now Pat. No. 6,897,892.

(60) Provisional application No. 60/240,510, filed on Oct. 13, 2000.

(51) Int. Cl.
*G09G 3/28* (2006.01)

(52) U.S. Cl. ........................................ 345/60

(58) Field of Classification Search ............... 345/7–9, 345/60, 169, 723, 745, 473; 359/634, 407, 359/630; 701/200; 348/148, 370, 151, 730; 382/103; 375/240.09; 362/545; 250/353, 250/206.1; 435/6; 349/11; 356/28; 473/199
See application file for complete search history.

(56) References Cited

U.S. PATENT DOCUMENTS

| | | | |
|---|---|---|---|
| 2,716,193 A | 8/1955 | Riolo | 250/215 |
| 3,803,407 A | 4/1974 | Anderson | 250/213 VT |
| 3,887,273 A | 6/1975 | Griffiths | 353/14 |

(Continued)

FOREIGN PATENT DOCUMENTS

DE 2633067 A1 2/1978

(Continued)

OTHER PUBLICATIONS

Fresnel Optics, Inc., Product Overview, Cover plus 7 pages.

(Continued)

*Primary Examiner*—Bipin Shalwala
*Assistant Examiner*—Prabodh Dharia
(74) *Attorney, Agent, or Firm*—O'Keefe, Egan, Peterman & Enders LLP

(57) ABSTRACT

A system is disclosed that includes a lens system that directs energy from a scene toward a detector and display unit coupled to the detector. The display unit forms an image using information received from the detector. The detector includes an array of detector elements, each detector element receiving energy from a portion of the scene and converting the received energy into information representative of the received energy. The detector sends the information associated with at least some of the detector elements to the display unit. The system further includes a computer coupled to the sensor. The computer selects the detector elements that should be used to form an image based on vehicle operating conditions and instructs the detector which detector elements should have their associated information provided to the display unit.

21 Claims, 4 Drawing Sheets

U.S. PATENT DOCUMENTS

| | | | |
|---|---|---|---|
| 4,052,123 A | 10/1977 | Yamazaki et al. | 350/189 |
| 4,131,818 A | 12/1978 | Wilder | 250/214 VT |
| 4,527,861 A | 7/1985 | Van Duyn | 359/606 |
| 4,664,475 A | 5/1987 | Ferrer | 350/174 |
| 4,740,780 A | 4/1988 | Brown et al. | 345/7 |
| 4,868,652 A | 9/1989 | Nutton | 358/113 |
| 4,901,146 A * | 2/1990 | Struhs et al. | 348/151 |
| 4,919,517 A | 4/1990 | Josh et al. | 359/630 |
| 4,934,771 A | 6/1990 | Rogers | 350/1.2 |
| 4,961,625 A | 10/1990 | Wood et al. | 350/174 |
| 4,970,653 A | 11/1990 | Kenue | 701/301 |
| 5,001,558 A | 3/1991 | Burley et al. | 358/113 |
| 5,013,135 A | 5/1991 | Yamamura | 350/174 |
| 5,023,451 A | 6/1991 | Burley | 250/330 |
| 5,028,119 A | 7/1991 | Hegg et al. | 350/174 |
| 5,056,890 A | 10/1991 | Iino et al. | 359/630 |
| 5,221,956 A * | 6/1993 | Patterson et al. | 356/28 |
| 5,237,455 A | 8/1993 | Bordo et al. | 359/632 |
| 5,289,312 A | 2/1994 | Hashimoto et al. | 359/487 |
| 5,289,315 A | 2/1994 | Makita et al. | 359/634 |
| 5,299,062 A | 3/1994 | Ogata | 359/517 |
| 5,343,313 A * | 8/1994 | Fergason | 349/11 |
| 5,361,165 A | 11/1994 | Stringfellow et al. | 359/631 |
| 5,394,520 A | 2/1995 | Hall | 345/632 |
| 5,401,968 A * | 3/1995 | Cox | 250/353 |
| 5,414,439 A | 5/1995 | Groves et al. | 345/7 |
| 5,486,002 A * | 1/1996 | Witler et al. | 473/199 |
| 5,497,271 A | 3/1996 | Mulvanny et al. | 359/631 |
| 5,504,622 A | 4/1996 | Oikawa et al. | 359/630 |
| 5,506,595 A | 4/1996 | Fukano et al. | 345/7 |
| 5,642,106 A | 6/1997 | Lee | 340/988 |
| 5,657,163 A | 8/1997 | Wu et al. | 359/630 |
| 5,686,957 A | 11/1997 | Baker | 348/36 |
| 5,729,016 A | 3/1998 | Klapper et al. | 250/334 |
| 5,731,903 A | 3/1998 | Cook | 359/633 |
| 5,734,357 A | 3/1998 | Matsumoto | 345/7 |
| 5,739,848 A | 4/1998 | Shimoura et al. | 348/119 |
| 5,748,377 A | 5/1998 | Matsumoto et al. | 359/633 |
| 5,781,243 A | 7/1998 | Kormos | 348/556 |
| 5,798,519 A * | 8/1998 | Vock et al. | 250/206.1 |
| 5,859,714 A | 1/1999 | Nakazawa et al. | 359/630 |
| 5,864,432 A * | 1/1999 | Deter | 359/634 |
| 5,867,133 A | 2/1999 | Toffolo et al. | 345/7 |
| 5,973,827 A | 10/1999 | Chipper | 359/356 |
| 6,014,259 A | 1/2000 | Wohlstadter | 359/619 |
| 6,057,966 A * | 5/2000 | Carroll et al. | 359/630 |
| 6,072,444 A | 6/2000 | Burns | 345/7 |
| 6,100,943 A | 8/2000 | Koide et al. | 349/11 |
| 6,262,848 B1 | 7/2001 | Anderson et al. | 359/630 |
| 6,359,737 B1 | 3/2002 | Stringfellow | 359/631 |
| 6,392,812 B1 | 5/2002 | Howard | 359/633 |
| 6,587,573 B1 | 7/2003 | Tabatabai | 382/104 |
| 6,646,799 B1 * | 11/2003 | Korniski et al. | 359/407 |
| 6,654,670 B2 | 11/2003 | Kakinami et al. | 701/1 |
| 6,678,394 B1 * | 1/2004 | Nichani | 382/103 |
| 6,909,539 B2 * | 6/2005 | Korniski et al. | 359/350 |
| 6,977,630 B1 * | 12/2005 | Donath et al. | 345/7 |
| 6,996,171 B1 * | 2/2006 | Walker et al. | 375/240.09 |
| 2002/0005999 A1 | 1/2002 | Hutzel et al. | 359/838 |
| 2002/0063778 A1 | 5/2002 | Kormos | 348/148 |
| 2004/0066376 A1 * | 4/2004 | Donath et al. | 345/169 |
| 2004/0180369 A1 * | 9/2004 | Franzen et al. | 435/6 |
| 2005/0063194 A1 * | 3/2005 | Lys et al. | 362/545 |
| 2005/0174473 A1 * | 8/2005 | Morgan et al. | 348/370 |

FOREIGN PATENT DOCUMENTS

| | | |
|---|---|---|
| EP | 1131293 | 10/1968 |
| EP | 0312094 A2 | 4/1989 |
| EP | 0321149 | 6/1989 |
| EP | 0515328 A1 | 11/1992 |
| EP | 0596729 A2 | 5/1994 |
| EP | 0643315 A1 | 3/1995 |
| EP | 0710866 A1 | 5/1996 |
| EP | 0742460 A2 | 11/1996 |
| EP | 0818701 A2 | 1/1998 |
| EP | 0859413 A2 | 8/1998 |
| EP | 1076255 A2 | 4/2000 |
| FR | 2693807 | 1/1994 |
| GB | 1584573 | 2/1981 |
| GB | 2179716 A | 3/1987 |
| GB | 2246900 A | 2/1992 |
| JP | 03-209210 | 9/1991 |
| JP | 06-268894 | 9/1994 |
| JP | 06-321011 | 11/1994 |
| JP | 07-159190 | 6/1995 |
| JP | 08-236514 | 9/1996 |
| JP | 09-052555 | 2/1997 |
| JP | 09185012 | 7/1997 |
| JP | 10-258682 | 9/1998 |
| JP | 2000280823 | 10/2000 |
| WO | WO89/03059 | 4/1989 |
| WO | WO98/28602 | 7/1998 |
| WO | WO99/33684 | 7/1999 |
| WO | WO01/63232 A1 | 8/2001 |
| WO | WO02/31439 A2 | 4/2002 |

OTHER PUBLICATIONS

Scott, Luke, and D'Agostino, John, "NVEOD FLIR92 Thermal Imaging Systems Performance Model"; 10 pages.

RCA Electro-Optics Handbook, Cover and Foreword plus pp. 118-121; 1974.

Smith, Warren J., "Modern Optical Engineering, the Design of Optical Systems", Inside and Outside Cover plus pp. 104-109; 1966.

U.S. Army Night Vision and Electronic Sensors Directorate, Visionics & Image Signal Processing Division, Fort Belvoir, VA, "FLIR Thermal Imaging Systems Performance Model", Analyst's Reference Guide, Document RG5008993, Jan. 1993, 21 pages.

Holst, Gerald C., "Testing and Evaluation of Infrared Imaging Systems", JCD Publishing Co., 3 Cover Pages, and pp. 308-343; 1993.

Richards, Oscar W., "Visual Needs and Possibilities for Night Automobile Driving", American Optical Corporation Research Group, Aug. 1967, 147 pages.

"Method and System for Displaying an Image", Specification, Claims and Abstract (28 pages), 4 pages of drawings, inventor Alexander L. Kormos, filed Jun. 5, 2002.

"Method and System for Deploying a Mirror Assembly from a Recessed Position", Specification, Claims, and Abstract (27 pages), 6 pages of drawings, inventors Aaron T. Raines, et al., filed Jun. 4, 2002.

U.S. Appl. No. 09/747,035, filed Dec. 21, 2000, entitled "Method and Apparatus for Reducing Distortion in a Displayed Image", by Douglas W. Anderson, 18 pages of text and 2 pages of drawings.

U.S. Appl. No. 09/930,369, filed Aug. 15, 2001, entitled "Method and Apparatus for Displaying Information with a Head-Up Display", by Alexander L. Kormos, et al., 32 pages of text and 5 pages of drawings.

U.S. Appl. No. 09/558,700, filed Apr. 25, 2000, entitled, "Method and Apparatus for Obtaining Infrared Images in a Night Vision System", Alexander L. Kormos, inventor, 30 pages; 3 pages of drawings.

U.S. Appl. No. 10/038,988, filed Jan. 4, 2002, entitled "System and Method for Providing Images for an Operator of a Vehicle", Alexander L. Kormos, inventor, 28 pages; 3 pages of drawings.

* cited by examiner

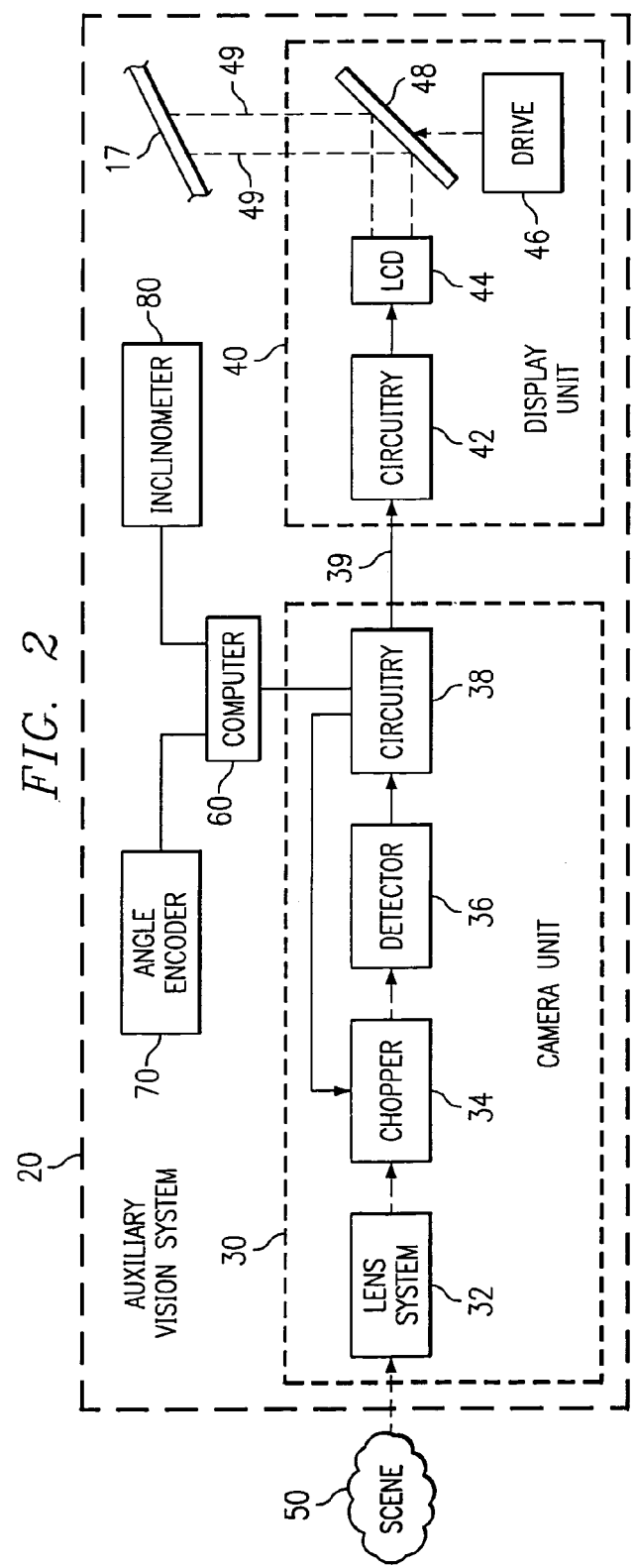

SYSTEM AND METHOD FOR FORMING IMAGES FOR DISPLAY IN A VEHICLE

RELATED APPLICATION

This application is a continuation application of application Ser. No. 09/972,543, filed October 8, 2001, entitled System and Method for Forming Images for Display in a Vehicle, which is issued as U.S. Pat. No. 6,897,892 and which in turn claims the benefit of U.S. provisional application Ser. No. 60/240,510, filed Oct. 13, 2000, entitled System and Method for Forming Images for Display in a Vehicle, all of which are hereby incorporated by reference in their entireties.

TECHNICAL FIELD OF THE INVENTION

This invention relates in general to image display systems and, more particularly, to a system and method for forming images for display in a vehicle.

BACKGROUND OF THE INVENTION

During daylight hours, the driver of a vehicle is able to readily detect and recognize objects that would be difficult or impossible to detect or recognize at night. For example, assume that a deer wanders into the road approximately 500 meters ahead of the vehicle. If this scenario occurs in the middle of a sunny day, the driver will not only be able to detect the fact that something is present ahead, but will readily recognize that it is a deer. On the other hand, if this same scenario occurs at night, particularly when the only illumination is from the headlights of the vehicle, the driver will not be able to detect that anything is there, much less recognize that it is a deer, because the deer will be beyond the range of the headlights. Moreover, by the time the driver does detect that something is in the road, and well before the driver can recognize what it is, the driver will be much closer to the deer than would be the case during daylight hours. Accordingly, the risk of a resulting accident is much higher at night than during the day.

Consequently, in order to supplement the natural vision of a driver, and thus reduce the risk of accidents, night vision systems have been developed for vehicles, including automobiles sold in the consumer market. Typical night vision systems include an infrared camera unit, which gathers information regarding the scene in front of the vehicle, mounted in the grill of the vehicle and a head-up display, which projects an image derived from information provided by the camera unit onto the windshield, mounted in the vehicle's dashboard.

In these systems, the image projected generally has field of view of approximately twelve degrees horizontal by four degrees vertical. While this field of view is acceptable for driving on a straight, level road, the field of view is inadequate when, for example, negotiating curves, where it would be helpful to observe into the turn, and/or climbing hills, where it would be helpful to observe the top of the hill while cresting it. Unfortunately, a simple solution to this limited field view problem is not readily available.

The most straightforward solution would be to increase the size of the image projected onto the windshield to display a larger field of view. However, the space in which the head-up display must fit within the dashboard severely limits such efforts.

Another solution is to minify the image projected onto the windshield, thereby projecting more of the scene in front of the vehicle onto the same area of the windshield. Minification, however, decreases the size of the objects that the driver sees in the projected image relative to the actual size of the objects and, hence, reduces the driver's ability to perceive the range of objects seen in the image.

SUMMARY OF THE INVENTION

The present invention provides a system and method that substantially reduce or eliminate at least some of the disadvantages of the prior art. Accordingly, the present invention, at least in some embodiments, provides a system and method that adjust the image projected to the driver of the vehicle based on the heading of the vehicle.

In particular embodiments, a system for forming images for display in a vehicle includes a lens system directing energy from a scene toward a detector and a display unit coupled to the detector. The display unit forms an image using information received from the detector. The system also includes the detector, which includes an array of detector elements, each detector element receiving energy from a portion of the scene and converting the received energy into information representative of the received energy. The detector sends the information associated with at least some of the detector elements to the display unit. The system further includes a computer coupled to the detector. The computer receives heading information, selects the detector elements that should be used to form an image based on the heading information, and instructs the detector which detector elements should have their associated information sent to the display unit.

In certain embodiments, a method for forming images for display in a vehicle includes directing energy from a scene toward a detector, receiving the energy from a portion of the scene at each of a plurality of detector elements, and converting the energy received at each detector element into information representative of the received energy. The method also includes determining a heading information of the vehicle, selecting the detector elements that should be used to form an image based on the heading information, and forming the image using the information associated with the selected detector elements.

The present invention possesses several technical features and advantages. For example, in some embodiments, the present invention allows the image displayed during a turn to be adjusted from directly in front of the vehicle to the inside of the turn, thereby improving the driver's view of the upcoming roadway during the turn. As another example, in particular embodiments, the present invention allows the image displayed while climbing a hill to be adjusted from directly in front of the vehicle to lower on the horizon, thereby improving the driver's view of the upcoming roadway while climbing, especially when cresting the hill. As a further example, in several embodiments, the present invention provides a camera unit that is relatively compact in size. Of course, particular embodiments may incorporate multiple and/or additional technical features and/or advantages.

Other technical features and advantages will be readily suggested to those skilled in the art from the following figures, written description, and claims.

BRIEF DESCRIPTION OF THE DRAWINGS

For a more complete understanding of the present invention, especially when viewed in conjunction with the following written description, reference is now made to the following drawings, in which:

FIG. 1 a diagrammatic view of a vehicle that includes one embodiment of an auxiliary vision system in accordance with the present invention;

FIG. 2 is a diagrammatic view of the auxiliary vision system of FIG. 1, showing in more detail the internal structure of a camera unit and a display unit of the auxiliary vision system;

DETAILED DESCRIPTION OF THE INVENTION

Figure 3:
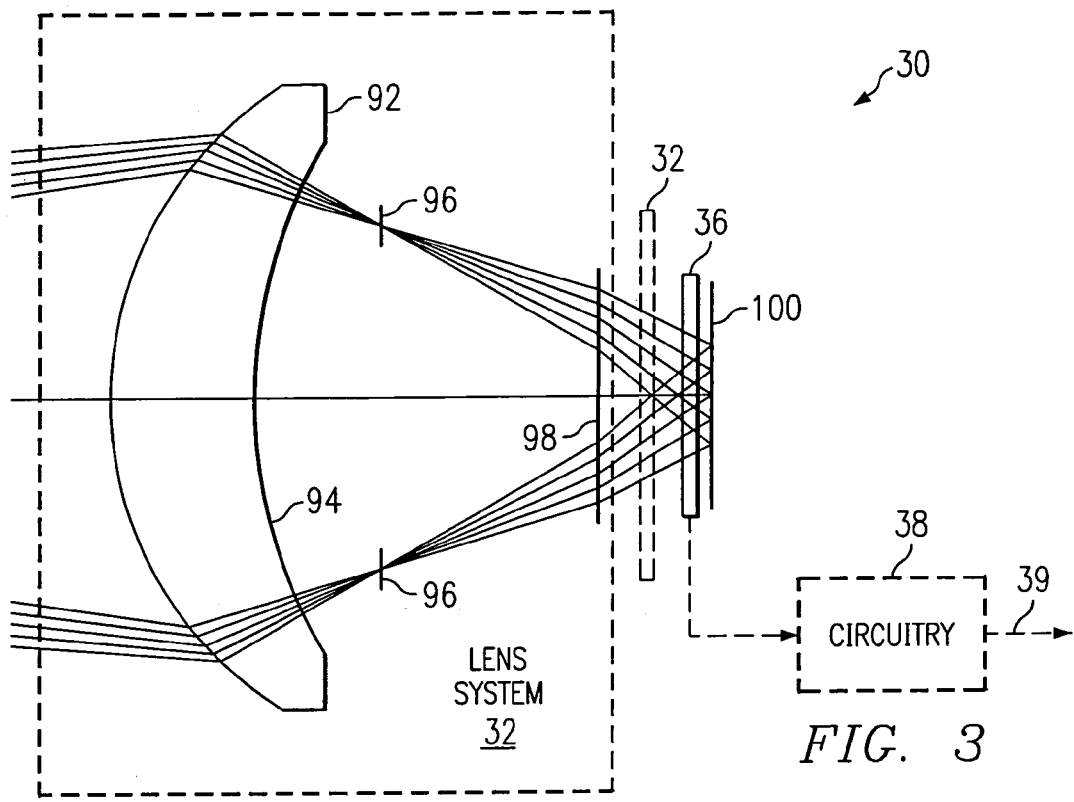
FIG. 3 is a diagrammatic view of the camera unit of FIGS. 1 and 2, showing in more detail a lens system which is a component of the camera unit.

FIG. 1 is a diagrammatic view of a vehicle 10 incorporating one embodiment of an auxiliary vision system 20 in accordance with the present invention. The auxiliary vision system 20 includes a camera unit 30, which in the illustrated embodiment is mounted at the front of vehicle 10, in the middle of a front grill 12. The camera unit 30 is electrically coupled at 39 to a display unit 40, which is also a part of the auxiliary vision system 20. The display unit 40 is mounted within an upwardly open recess provided in the top of a dashboard 14 of the vehicle 10, and can project an image onto the inside surface of a windshield 17, as indicated diagrammatically by arrow 49, for display to the driver. The display unit 40 is of a type that is commonly known as a head-up display (HUD). The camera unit 30 is also electrically coupled to a computer 60 at 69. The computer 60 is also part of the auxiliary vision system 20 and provides instructions to camera unit 30 based on heading information it receives from an angle encoder 70, which is coupled to a steering column 16 of vehicle 10 and electrically coupled to computer 60 at 79, and/or an inclinometer 80, which is coupled to the frame of vehicle 10 and electrically coupled to computer 60 at 89. Angle encoder 70 and inclinometer 80, which are two types of sensors, are also a part of auxiliary vision system 20. In general, any type of sensor that can provide information regarding the heading of vehicle 10, such as, for example, steering rate, inclination rate, and/or orientation, may be used in auxiliary vision system 20. Additionally, one, two, or even several sensors may be used in different embodiments. The auxiliary vision system 20 of FIG. 1 is discussed in more detail later.

When a driver is operating a vehicle at night, the driver's ability to see the road ahead is substantially more limited than would be case for the same section of road during daylight hours. This is particularly true in a rural area under conditions where there is little moonlight, are no street lights, and are no headlights of other vehicles. If an animal such as a deer happens to wander into the road at a location 500 meters ahead of the vehicle, the driver would readily notice and recognize the deer during daylight hours, whereas at night the deer may initially be beyond the effective reach of the illumination from the vehicle's headlights. Moreover, even when the headlights begin to illuminate the deer, the driver may not initially notice the deer, because the deer may be a brownish color that is difficult to distinguish from the surrounding darkness. Consequently, at the point in time when the driver first realizes that there is a deer in the road, the vehicle will be far closer to the deer in a nighttime situation than would be the case during daylight hours. There are many other similar high risk situations, for example, where a pedestrian is walking along the road.

A primary purpose of auxiliary vision system 20 of FIG. 1 is to provide the driver of the vehicle 10 with information above and beyond that which the driver can discern at night with the naked eye. In this regard, the camera unit 30 can detect infrared information at a distance well beyond the effective reach of the headlights of the vehicle 10. In the case of a life form such as an animal or a human, the heat signature of the life form, when presented in an infrared image derived from the camera unit 30, will usually have a significant contrast in comparison to the relatively hotter or cooler surrounding natural environment. As discussed above, this is not necessarily the case in a comparable nighttime image based on visible light.

Thus, in addition to the visible image that is directly observed by the driver through the windshield 17 based on headlight illumination and any other available light, the auxiliary vision system 20 provides a separate and auxiliary image, based on infrared radiation, that is projected onto the inside of the windshield 17. This auxiliary image can provide a detectable representation of lifeforms or objects ahead that are not yet visible to the naked eye. Further, the auxiliary image can provide a much more striking contrast than a visible image between the lifeforms or objects and the surrounding scene. Note that the auxiliary vision system 20 may also be useful during daylight hours to supplement the view of objects seen with natural light.

In an auxiliary vision system, such as the auxiliary vision system 20 of FIG. 1, it is a generally accepted design principle that an object in the auxiliary image should appear to the driver to have substantially the same size as the corresponding real-life object appears to have when viewed by the driver through the windshield. Thus, for example, if an object along the roadway ahead appears to the driver to be approximately one inch tall when viewed through the windshield, the same object should appear to the driver to be one inch tall when viewed in the auxiliary image at that same point in time. This is known in the art as maintaining a 1:1 magnification factor for the auxiliary display. Of course, the magnification factor does not have to be precisely 1:1, and could for example be within 25% higher or lower than 1:1. To facilitate an explanation of the present invention, however, it will be assumed that the magnification factor is approximately 1:1.

Auxiliary vision system 20 of FIG. 1 involves competing design considerations with respect to the field of view (FOV) that it provides. It is, of course, desirable to minimize the size and weight of both the camera unit 30 and the display unit 40. However, if the effective field of view (FOV) of the auxiliary vision system 20 is varied, the minimum sizes of the camera unit 30 and the display unit 40 tend to vary inversely. In particular, as the effective FOV is progressively increased, the size of the optics in the camera unit 30, and thus the size of camera unit 30 itself, can be progressively decreased, but the size of the display unit 40 must be progressively increased. Conversely, as the effective FOV is progressively decreased, the size of the display unit 40 can be decreased, but the size of the camera optics, and thus the size of the camera unit 30 itself, must be increased. Since the sizes of the camera unit 30 and display unit 40 thus vary inversely, a balance must be reached for purposes of any particular system.

As a practical matter, one side of this balance is determined by the display unit, such as display unit 40, due to yet another consideration. In particular, it is typically desirable to project onto the windshield, such as windshield 17, a relatively large image. However, as a practical matter, the ability to achieve this is limited by the extent to which the dashboard, such as dashboard 14, has space available to accommodate a display unit. In particular, if the display unit is given the largest physical size that is reasonable for the dashboard area of an average automobile, and if 1:1 magnification is maintained, as discussed above, the display unit will produce an image on the windshield that has an effective horizontal FOV of approximately ten to fourteen degrees, and in the disclosed embodiment the horizontal FOV is approximately twelve degrees. Of course, the invention is compatible with a FOV larger than fourteen degrees or smaller than ten degrees. However, the disclosed embodiment uses a FOV of about twelve degrees because this value is typical of the displays presently used in existing night vision systems in the automotive industry.

Given the effective horizontal FOV of about twelve degrees in the disclosed embodiment, as established by criteria relating to the display unit 40, the associated camera unit 30 must offer this needed horizontal FOV with a suitable degree of resolution. A feature of certain embodiments of the present invention is the provision of an improved camera unit 30, which provides the needed FOV with a suitable level of resolution, but which has a substantially reduced size, weight and cost in comparison to pre-existing camera units.

FIG. 2 is a diagrammatic view of the auxiliary vision system 20 of FIG. 1, showing in greater detail the internal structure of both the camera unit 30 and the display unit 40. More specifically, thermal radiation from a scene 50 enters the camera unit 30 and passes through a lens system 32 and a chopper 34 to a detector 36. The lens system 32 directs the incoming radiation onto an image plane of the detector 36.

In the disclosed embodiment, the chopper 34 is a rotating disk of a known type, which has one or more circumferentially spaced openings. As the chopper 34 is rotated, it periodically permits and prevents the travel of incoming infrared radiation to the detector 36.

Also in the disclosed embodiment, the detector 36 is a commercially available focal plane array or staring array detector, which has a two-dimensional matrix of detector elements, where each detector element produces a respective pixel of a resulting image. In particular, detector 36 is an uncooled pyroelectric barium strontium titanate (BST) detector, although numerous other types of detectors would also be useful in auxiliary vision system 20.

The circuitry 38 is provided to control the detector 36 and read out the images that it detects, and also to synchronize the chopper 34 to operation of the detector 36. Further, based on information from computer 60, the circuitry 38 sends the information obtained from detector 36 through the electrical coupling 39 to the circuitry 42 within the display unit 40.

The circuitry 42 controls a liquid crystal display (LCD) 44, which in the disclosed embodiment has a two-dimensional array of 384 by 220 pixel elements. The display unit 40 has a horizontal to vertical aspect ratio of 3, as a result of which the portion of the LCD 44 that is actually used is 384 by 107 pixel elements. The circuitry 42 takes successive images obtained from the detector 36 through circuitry 38, and presents these on the LCD 44. In the disclosed embodiment, the LCD 44 includes backlighting that makes the image on LCD 44 visible at night.

This visible image is projected onto a mirror 48 that reflects the image so as to be directed onto the inner surface of the windshield 17, creating a virtual image for the driver. Although the mirror 48 is shown diagrammatically in FIG. 2 as a planar component, it actually has a relatively complex curvature that is known in the art, in order to compensate for factors such as the non-linear curvature of the windshield 17, parallax due to the inclination of the windshield 17, and so forth. The curvature also gives mirror 48 some optical power, so that it imparts a degree of magnification to the image that it projects onto the windshield 17. The mirror 48 is movably supported, and its position at any given time is determined by a drive mechanism 46. Using the drive mechanism 46, the driver may adjust the mirror 48 so that the image on the windshield 17 is in a viewing position comfortable for that particular driver. This is analogous to the manner in which a driver may adjust a sideview mirror of a vehicle to a suitable and comfortable position. Once the driver has finished adjusting the mirror 48 to a suitable position, it remains in that position during normal operation of the auxiliary vision system 20.

FIG. 3 is a diagrammatic view of the camera unit 30, and shows in more detail the optical structure within the lens system 32. More specifically, the lens system 32 includes an objective lens 92, which directs incoming radiation in a manner forming an image at an image plane 100 that is adjacent the detector 36. The lens 92 has a diffractive surface pattern 94 on the side thereof nearest the detector 36. As discussed in more detail below, the disclosed embodiment uses only a subset of the pixel elements of the detector 36 for each image, and FIG. 3 thus shows the radiation being imaged onto only a portion of the detector 36, rather than the entire detector 36. In reality, however, the lens system 32 is directing radiation from scene 50 onto all of detector 36.

In the disclosed embodiment, the lens 92 is made of Chalcogenide glass of a type that is commonly known in the art as TI-1173, and which is available from Raytheon Company of Lexington, Mass. Further, the objective lens 92 has a diameter of 1.5", an effective focal length (EFL) of 1.5", and an optical speed of f/1, where optical speed is a standardized measure of refractive strength per dimensional unit. Thus, the lens system 32 has a smaller aperture than preexisting systems. It is a feature of at least one embodiment of the auxiliary vision system 20 according to the invention that the camera unit 30 can have an EFL less than about 2.25", and preferably less than about 1.9", while providing a horizontal FOV less than about fourteen degrees and preferably about twelve degrees for an image. A further feature of this embodiment is the use for lens 92 of an f/1 optical speed, rather than the f/1.2 optical speed used in an existing system, because the f/1 optical speed provides an increase of over 40% in the infrared energy imaged onto the detector 36, in comparison to use of an f/1.2 optical speed. When the lens 92 has an f/1 optical speed, the resulting image information from the detector 36 has more contrast than it would if the lens 92 had an f/1.2 optical speed.

After passing through the lens 92, the converging radiation passes through an aperture stop 96, and then through a substantially flat diffractive field lens 98, which is made of a polymer material, and which has a diffractive surface pattern on one side. The diffractive surface patterns on the lenses 92 and 98 facilitate color correction. The lens system 32 is of a type disclosed in U.S. Pat. No. 5,973,827. The specific prescription information for the lens system 32 of the disclosed embodiment is set forth in Table 1.

TABLE 1

PRESCRIPTION FOR LENS SYSTEM 32

| Parameter | | | Lens 92 | Lens 98 |
|---|---|---|---|---|
| Radii: | | R1 | 1.02740" | Flat |
| | | R2 | 1.40648" | Flat |
| Aspheric Coefficients: | A4 | R1 | 0 | 0 |
| | A6 | R1 | 0 | 0 |
| | A8 | R1 | 0 | 0 |
| | A10 | R1 | 0 | 0 |
| | A4 | R2 | 0.0342740 | 0 |
| | A6 | R2 | 0.0110210 | 0 |
| | A8 | R2 | −0.0013682 | 0 |
| | A10 | R2 | 0.0048045 | 0 |
| Diffractive Coefficients: | C1 | R1 | 0 | 0 |
| | C2 | R1 | 0 | 0 |
| | C3 | R1 | 0 | 0 |
| | C1 | R2 | 0.030249 | 0.05157 |
| | C2 | R2 | 0 | −1.04960 |
| | C3 | R2 | 0 | −2.22110 |
| Thickness: | | | 0.320" | 0.002" |
| Material: | | | Chalcogenide Glass 1173 | Polymer |
| Refractive Index: | | | 2.6 | 1.5 |

Figure 4:
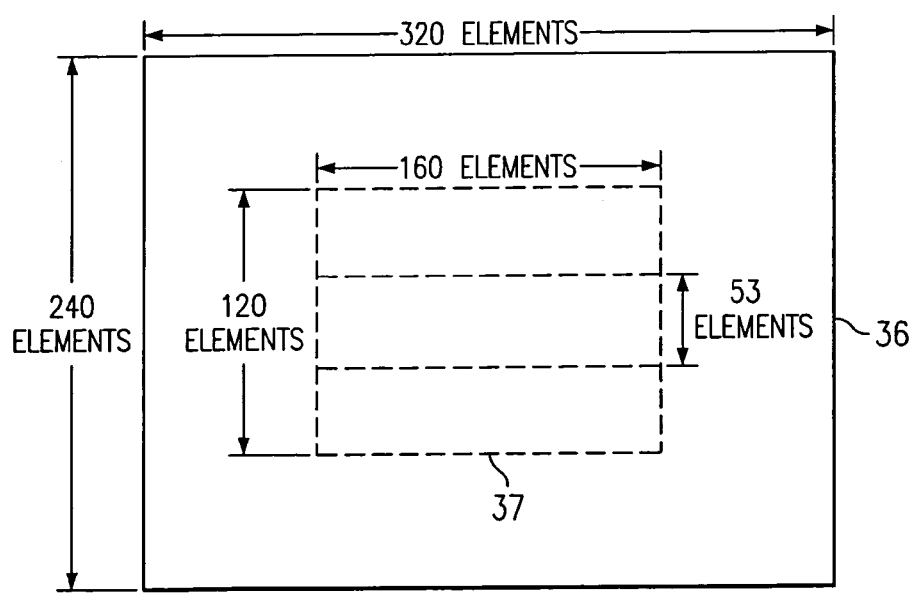
FIG. 4 is a diagrammatic view of an infrared detector that is a component of the camera unit of FIGS. 1 and 2.

FIG. 4 is a diagrammatic view of the detector 36. As discussed above, the detector 36 includes a two-dimensional array of detector elements that each correspond to a respective pixel of a detected image. In more detail, and as indicated in FIG. 4, the detector 36 is an array of 320 detector elements by 240 detector elements. Each detector element has a size of approximately 48.5 microns by 48.5 microns. As mentioned above, the disclosed embodiment effectively uses only a portion of the detector elements of the detector 36 at a time, as indicated diagrammatically by a broken line 37. The portion 37 of the detector 36 represents 25% of the detector elements, or in other words an array of 160 by 120 detector elements. The portion 37 shown in FIG. 4 happens to be located in the center the detector 36, which is the portion used for straight, level travel of vehicle 10, to be discussed below, but it could be any portion of the detector 36. For example, it might be a portion of equal size that is located in the upper left corner of the detector 36. The camera unit 30 processes and outputs the information obtained from all of the 160 by 120 detector elements located in the portion 37 of the detector 36. However, in the disclosed embodiment, the particular display unit 40 discards some of this information. More specifically, and as discussed above, the display unit 40 has a horizontal to vertical aspect ratio of approximately 3. Consequently, while the display unit 40 uses a full 160 pixels of information from detector 36 in the horizontal direction, it uses only 53 pixels in the vertical direction, as indicated diagrammatically by dotted lines in FIG. 4. A further consideration is that, since the circuitry 38 receives images with fewer pixels, the processing load is reduced, and thus less circuitry and/or slower circuitry can be used, which reduces the cost of the circuitry 38.

Note that detector 36 uses a smaller number of detector elements to detect an image in the scene 50 than display unit 40 has pixels to form the image, 160×120 v. 384×220. Thus, to avoid minification of the image, the information from the selected detector elements must be distributed over all of the pixels. To accomplish this, an interpolation scheme, such as, for example, the well known nearest neighbor algorithm, is used to interpolate between the information determined by each detector element used to detect the image to produce additional information for display unit 40. In particular, the interpolation scheme is used to generate information for each pixel of the display unit 40 that does not have a corresponding detector element. Of course, in other embodiments, detector 36 could use the same or a greater number of detector elements to detect an image than display unit 40 has pixels.

Figure 5:
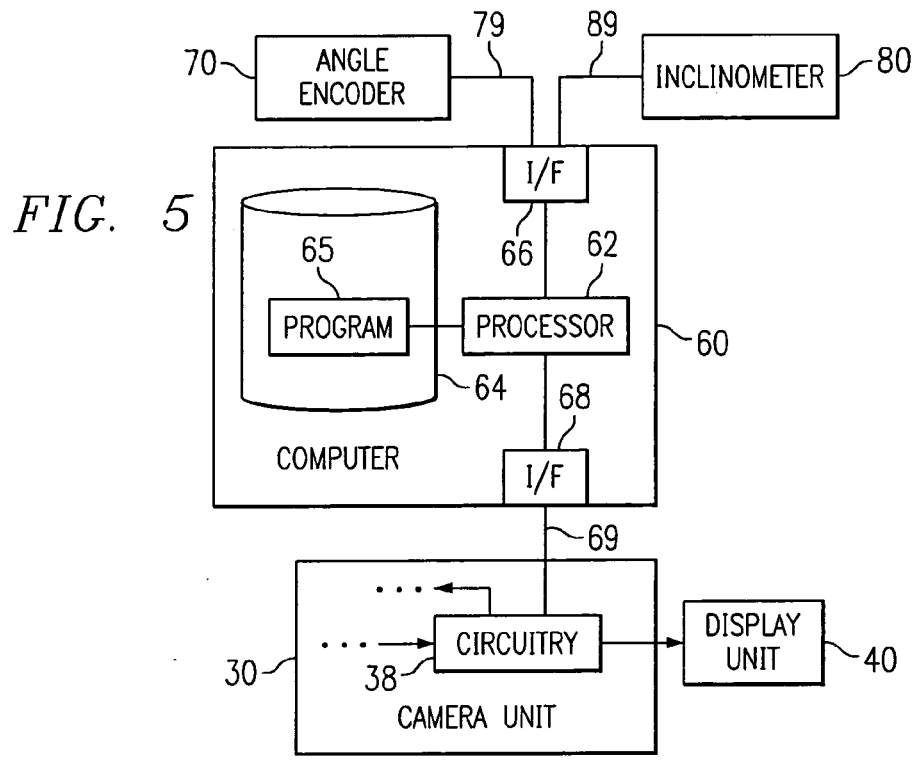
FIG. 5 is a diagrammatic view of the auxiliary vision system, showing in more detail a computer which is a component of the auxiliary vision system.

FIG. 5 is a diagrammatic view of auxiliary vision system 20, showing in more detail the internal structure of computer 60. As illustrated, computer 60 includes a processor 62 coupled to a memory 64, an interface 66, and an interface 68. Memory 64 includes a program 65 that has instructions for selecting the detector elements to be used to form an image based on heading information.

In operation, processor 62 receives heading information over electrical coupling 79 from angle encoder 70 and over electrical coupling 89 from inclinometer 80 through interface 66. Using this heading information, processor 62, according to the instructions in program 65, selects the detector elements of detector 36 for which the associated information should be used to form an image by display unit 40. Processor 62 sends appropriate instructions regarding these detector elements to circuitry 38 of camera unit 30 over electrical coupling 69 through interface 68. Circuitry 38 receives the instructions regarding the selected detector elements and sends the information associated with each selected detector element, along with any interpolated information, to display unit 40.

In the illustrated embodiment, circuitry 38 obtains the information from the selected detector element by fast clocking through the unselected detector elements, which basically ignores the information in the detector elements. In other embodiments, circuitry 38 obtains the information from the selected detector elements by storing the information from all detector elements in a memory and then selecting the information for the selected detector elements. In still other embodiments, circuitry 38 dynamically alters the initial detector element at which to begin a scan of the detector elements for an image to obtain the information from the selected detector elements. Various other techniques exist for acquiring the information from the selected detector elements.

Processor 62 may be an application specific integrated circuit (ASIC), a digital signal processor (DSP), a field programmable gate array (FPGA), a complex instruction set computer (CISC), a reduced instruction set computer (RISC), or any other type of device for electronically manipulating electronic information. Memory 64 may be random access memory (RAM), compact-disk read-only memory (CD-ROM), registers, or any other type of optical or magnetic volatile or non-volatile information storage device. In particular embodiments, computer 60 is coupled to the sensors and the camera unit 30 through a control area network (CAN) bus.

In certain embodiments, computer 60 may include image processing software, which could be part of program 65 or a separate program, to determine the direction of the roadway, which can be used to determine the heading of vehicle 10 and, hence, select the image to display to the driver. To accomplish this, computer 60 would receive information associated with some or all of the detector elements, as either an analog or digital signal, and use this information as input to the image processing software. From this, computer 60 would, using the image processing software, determine the direction of the roadway—curvature, inclination, etc.— and use this determination to select the detector elements to be used to form an image. The image processing software could utilize road geometry analysis, lane analysis, or any other image processing technique for determining the current or future direction of the roadway. Note, the image processing software could work in conjunction with or to the exclusion of any sensor, such as angle encoder 70 and inclinometer 80. Moreover, in other embodiments, the image processing software may be a part of camera unit 30 or other components of auxiliary vision system 20.

Figure 6A:
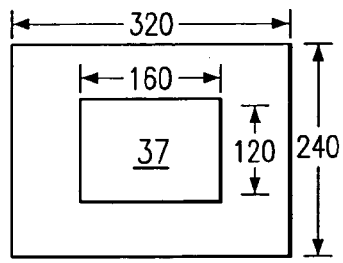
FIGS. 6A–D illustrate some of the different portions of a detector, which is a part of the camera unit, used during different operating conditions of the vehicle.

FIGS. 6A–D illustrate some of the different portions of detector 36 used during different operating conditions of vehicle 10. In FIG. 6A, vehicle 10 is traveling on a straight, level road. Accordingly, angle encoder 70 is indicating that no turn is being performed, and inclinometer 80 is indicating that no inclination is being traversed. Thus, based on this heading information, computer 60 is instructing camera unit 30 to send the information associated with the center 160× 120 detector elements, along with any interpolated information, to display unit 40.

Figure 6B:
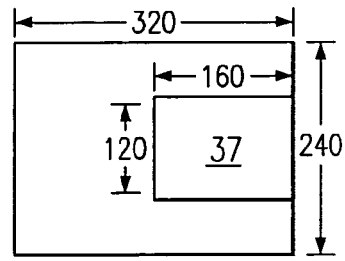

In FIG. 6B, vehicle 10 is making a hard right turn. Accordingly, angle encoder 70 is indicating that an intensive right turn is being performed, and inclinometer is indicating that no inclination is being traversed. Thus, based on this heading information, computer 60 is instructing camera unit 30 to send the information associated with the vertically centered, right most 160×120 detector elements, along with any interpolated information, to the display unit 40.

Figure 6C:
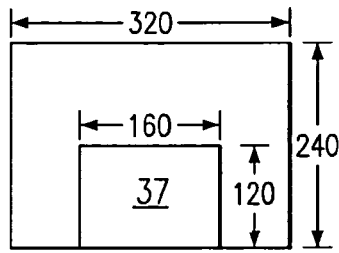

In FIG. 6C, vehicle 10 is traveling up a steep incline. Accordingly, angle encoder 70 is indicating that no turn is being performed, and inclinometer 80 is indicating that an incline is being traversed. Thus, based on this heading information, computer 60 is instructing camera unit 30 to send the information associated with the bottom most, horizontally centered 160×120 detector elements, along with any interpolated information, to display unit 40.

Figure 6D:
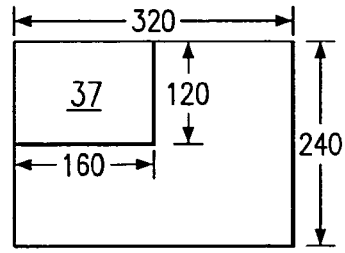

Finally, in FIG. 6D, vehicle 10 is making a hard left turn while traveling down a steep incline. Accordingly, angle encoder 70 is indicating a hard left turn is being performed, and inclinometer 80 is indicating that a decline is being traversed. Thus, based on this heading information, computer 60 is instructing camera unit 30 to send the information associated with the upper most, left most 160×120 detector elements, along with any interpolated information, to the display unit 40.

As can be seen, with the illustrated detector 36, the imaged portion of the scene 50 displayed to the driver of vehicle 10 may be adjusted up to six degrees to the left or right and up to four and one-half degrees up or down by adjusting portion 37 of detector 36. The imaged portion of the scene 50 displayed may be gradually adjusted from the center to the edges as the vehicle 10 undergoes various heading changes because a new image is determined every sixtieth of a second, i.e., the detector 36 is scanned at a rate of 60 Hz. In other embodiments, different scan rates may be used. Additionally, detector 36 allows for eighty gradations when moving horizontally in one direction and for sixty gradations when moving vertically in one direction. These gradations allow the displayed image to be scanned across all of scene 50 that detector 36 detects in a relatively smooth manner. Of course, in embodiments where a larger or smaller number of detector elements are used, the degree to which the FOV presented to the driver of vehicle 10 may be moved will be larger or smaller, respectively.

As evident from the foregoing discussion, the auxiliary vision system 20 takes advantage of the fact that the detector 36 is receiving energy from a scene 50 that is larger than that which can be instantaneously displayed by display unit 40 without significant minification to adjust the image presented to the driver of vehicle 10 as the heading of vehicle 10 changes. Thus, auxiliary vision system 20 electronically adjusts the line of sight of the image displayed to the driver based on the heading of vehicle 10. Additionally, particular embodiments of the present invention can be implemented with a variety of other lens system/detector/display unit combinations as long as the detector detects a larger field of view than the display unit is able to instantaneously use.

Returning to camera unit 30 of the disclosed embodiment, as evident from the foregoing discussion, camera unit 30 uses only 25% of the detector elements that are present in the detector 36 to form an image. This is partially because the detector 36 is an existing part that is readily available. The present invention may, as mentioned, alternatively be implemented with other detectors. As improvements are made in the technology for fabricating detectors, it will soon become possible to fabricate a detector in which the detector elements are smaller, for example on the order of 25 microns by 25 microns. In such a detector, a 300 by 400 array of detector elements would have a size which is only 25% of the size of an equivalent detector made using current fabrication technologies. With reference to FIG. 3, this will allow the diameter of lens 92, the EFL of lens 92, the diameter of aperture stop 96, and the diameter of lens 98 to each be reduced by a factor of approximately 2, which in three dimensions will reduce the overall volume of the lens system 32 by a factor of approximately 8. This represents a further reduction in size, weight and cost, which is within the scope of the present invention.

One feature of certain embodiments of the present invention is the recognition that the size, weight and cost of a camera unit for an auxiliary vision system can be substantially reduced in comparison to preexisting camera units, without any change to the FOV, magnification, or effective level of resolution provided by the display unit 40. According to the invention, this can be achieved by using an array of detector elements in the camera unit 30 that has a substantially smaller number of detector elements than has been thought necessary in preexisting camera units. In this regard, and assuming for purposes of discussion that the display unit 40 has an ideal ability to reproduce the resolution of an image received from the camera unit, there are limits on the ability of an infrared detection system and its driver to detect an object which is far away, or to recognize details of such an object. Further, the ability to detect an object and recognize detail may vary, depending on a variety of factors. As a result, there are industry standards which are used to measure the capability of an infrared detection system and its driver to detect an object at a distance, and the capability to recognize detail regarding the object.

Figure 7:
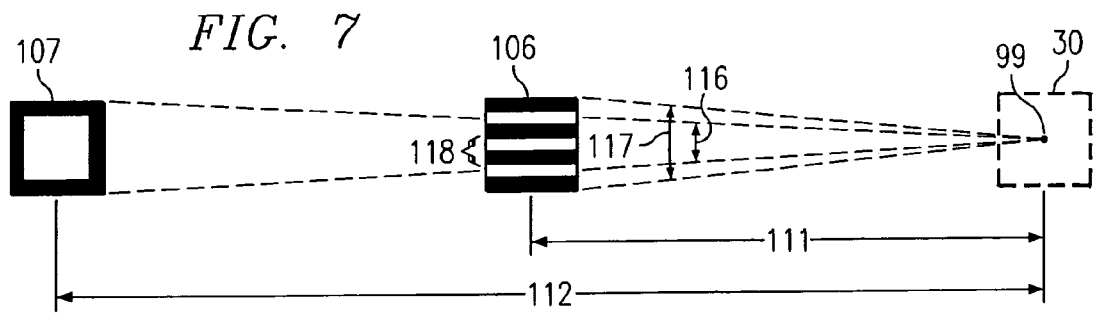
FIG. 7 is a diagrammatic top view showing use of the camera unit of FIG. 2 in association with standard detection and recognition techniques.

One such industry standard involves the determination of a minimum resolvable temperature (MRT) and a minimum detectable temperature (MDT), which each represent an average for several observers under a given set of ambient conditions. Since they include assessment by human observers of an image from an infrared detection system, when they are applied in the context of a auxiliary vision system, they take into account the limitations of the eye of a driver to resolve detail. These standards are discussed with reference to FIG. 7, which is a diagrammatic top view of the camera unit 30, a standard target 106 used to measure recognition capability based on the MRT standard, and a standard target 107 used to measure detection capability based on the MDT standard. In practice, the targets 106 and 107 would actually each be oriented to extend perpendicular to the plane of FIG. 7, so that each would face the camera unit 30. However, since FIG. 7 is a diagrammatic view, they are oriented to be parallel to the plane of FIG. 7 so they are clearly visible for purposes of the explanation which follows.

More specifically, the target 106 is square, and includes four black bars and three white bars of equal width which are parallel and interleaved. If the distance 111 to the target 106 is not too large, an operator of the system containing the camera unit 30 will be able to not only detect that the target 106 is present, but to readily distinguish the vertical bars from each other. If the target 106 is then moved progressively away from the viewpoint 99, so as to increase the distance 111, it will eventually reach a position where it is possible to detect the fact that the target 106 is present, but not to recognize details such as the presence of the black and white bars. This position represents the limit of recognition capability, as opposed to detection capability.

If the target 106 is then moved progressively further away from the viewpoint 99, there will come a point at which the camera unit 30 can no longer detect that the target 106 is even present. In order to measure this detection capability, as opposed to recognition capability, it is common in the industry to use a different type of target, such as that shown at 107. The target 107 has the same size as the target 106 and is also a square target, but has a square black outer border, and a square white center. As the target 107 is moved progressively further from the viewpoint 99, so as to increase the distance 112, there will come a point at which it is no longer possible for the operator to detect the presence of the target 107. According to the MDT industry standard, this is the limit of detection capability.

For purposes of the MRT and MDT standards, the position and size of a target relative to a viewpoint are not expressed in terms of the actual physical distance to the target, but in terms of the angle subtended by the target or a portion of it. For example, in FIG. 7, the MDT target 107 subtends an angle 116. The target 106 is of equal size, but is closer to the viewpoint 99, and therefore subtends a larger angle 117. In the specific case of the MRT target 106, the position of the target 106 is normally expressed in terms of cycles per milliradian, where one cycle 118 is the combined width of one black bar and one white bar. The target 106 thus has a cumulative width of 3.5 cycles. If the angle 117 is X milliradians, then in FIG. 7 the position of the target 106 would be expressed as 3.5/X cycles per milliradian.

Assume that the MRT target 106 in FIG. 7 is at a position where, for purposes of the ambient conditions typical for night driving, it is at the maximum distance from the viewpoint 99 for which recognition is possible according to the MRT standard. In other words, if the target 106 was moved further away from the viewpoint 99, it would still be possible to detect that the target 106 is present, but it would not be possible to recognize details such as the presence of the black and white bars. Also assume that the camera unit 30 is at the viewpoint 99. In pre-existing auxiliary vision systems, it was assumed that each bar of the MRT target had to be imaged onto two or more elements of the detector in the camera unit (in a direction along a line extending perpendicular to the bars of the target), in order to avoid a loss of resolution. One feature of these embodiments of the present invention is the recognition that the pre-existing approach represents overdesign, because each bar of the target does not need to be imaged onto two or more elements in order to have suitable resolution for purposes of achieving detection in an auxiliary vision system.

More specifically, as a lower limit, it is sufficient if each of the black and white bars of the target 106 are imaged directly onto one detector element in a direction along a line extending perpendicular to the bars. This limit is referred to as the Nyquist spatial frequency for the camera unit 30. One feature of particular embodiments of the present invention is that the camera unit 30 is designed so that the Nyquist spatial frequency has a relationship to the limits of MRT recognition which avoids use of the detector in a manner providing an excessive level of resolution that effectively increases the size, weight and cost of the camera unit. In this regard, these embodiments of the present invention provide an auxiliary vision system capable of providing MRT recognition of a multi-bar target having a Nyquist spatial frequency which is less than approximately 0.63 cycles per milliradian, and preferably less than 0.46 cycles per milliradian. In the disclosed embodiment, the Nyquist spatial frequency is approximately 0.38 cycles per milliradian.

Figure 8:
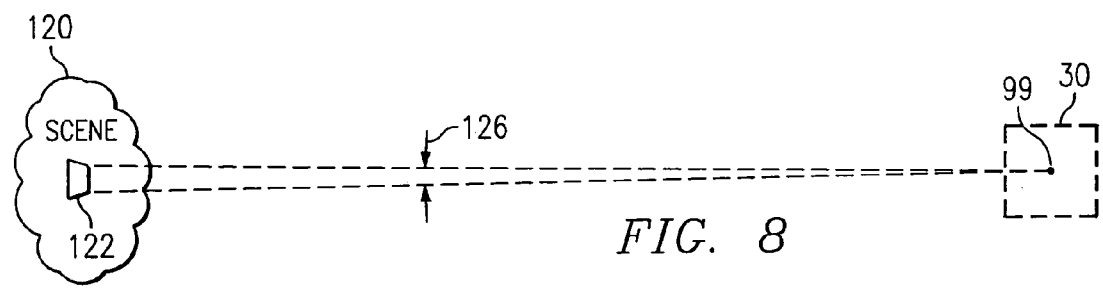
FIG. 8 is a diagrammatic view showing a portion of a scene which is imaged onto a single detector element of a detector disposed in the camera unit of FIG. 2.
Figure 9:
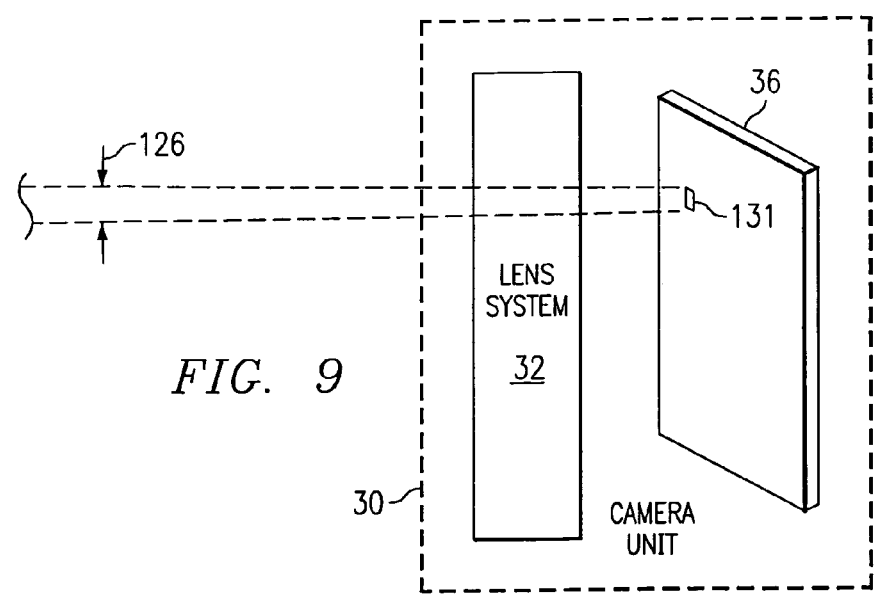
FIG. 9 is an enlarged view of a portion of FIG. 6, diagrammatically showing additional detail within the camera unit.

FIGS. 8 and 9 show a different way of expressing the same basic relationship. FIG. 8 is a diagrammatic view of the camera unit 30 at the viewpoint 99, while observing a remote scene 120. Reference numeral 122 designates a very small portion of the scene 120, which will be imaged onto a single detector element of the detector 36 within camera unit 30. The portion 122 of the scene 120 subtends an angle 126 with respect to the viewpoint 99. Stated differently, the angle 126, in milliradians, defines the portion of any scene which will be imaged onto a single detector element of the particular camera unit 30.

In this regard, FIG. 9 is an enlarged view of the portion of FIG. 8 that includes the camera unit 30. The chopper 34 and circuitry 38 of the camera unit 30 have been omitted in FIG. 9 for clarity. FIG. 9 shows that the angle 126 represents the portion of any scene which, after optical processing by the lens system 32, is imaged onto a single respective detector element 131 of the detector 36. According to certain embodiments of the invention, the portion of a scene imaged onto a single detector element has a size in the range of approximately 0.8 to 3.5 milliradians, and preferably in the range of 1.1 to 1.5 milliradians. In the disclosed embodiment, the camera unit 30 images approximately 1.3 milliradians of the scene 50 onto each detector element 131.

The present invention provides a number of technical advantages in certain embodiments. The physical volume of the lens system 32 for the camera unit 30 is reduced by a factor of approximately eight in comparison to preexisting night vision systems, which results in a substantial reduction in the overall size and weight of the camera unit 30. A related advantage is that the size of the objective lens 92 is substantially reduced. This reduces the amount of expensive material such as Chalcogenide glass that is required to fabricate the objective lens, and thus reduces the cost of the lens. Moreover, as the size of the lens is reduced, the effective yield from the lens manufacturing process is increased, which effects a further reduction in the cost of the lens.

Still another reduction in size and cost is available from the fact that a smaller detector unit can be used, in particular a detector unit which has a substantially smaller number of detector elements than was used in preexisting night vision systems. This reduces the amount of costly infrared sensitive material required to make the detector unit, while increasing the number of detector units obtained from a given wafer for the approximately fixed cost of processing the wafer, and also increasing the effective yield of parts from each wafer.

Moreover, since the size of the lens system is substantially reduced, it becomes more practical to use an improved optical speed for the lens, which in turn increases the performance of the system.

Taken together, these advantages provide a substantially reduced cost, weight and size for the camera unit of a auxiliary vision system, with the option of improved performance, all of which are important in highly competitive commercial markets, such as the consumer automotive market. In addition, reducing the size and weight of the camera unit permits it to be more efficiently and less noticeably integrated into a front portion of a vehicle, such as the grill or a bumper.

Although the one embodiment has been illustrated and described in detail, it should be understood that various changes, substitutions and alterations can be made therein without departing from the scope of the invention. For example, one possible optical configuration for the lens system has been illustrated and described in detail, but it will be recognized that there are variations and modification to this optical configuration which are within the scope of the present invention. In addition, while the disclosed embodiment includes chopper 34, it will be recognized that there are variations of the present invention in which chopper 34 could be omitted.

Further, and as discussed above, the disclosed embodiment uses only a portion of the detector elements in the infrared detector, but the present invention encompasses use of a smaller detector having a number of detector elements which more closely corresponds to the number of detector elements actually utilized by the disclosed embodiment. In addition, although the foregoing explanation of the disclosed embodiment sets forth the specific number of detector elements which are utilized, it will be recognized that the specific number of detector elements can be varied to some extent to accommodate various factors, including but not limited to a change in the effective field of view for the display unit. Also, although the disclosed embodiment uses a head-up display, it will be recognized that some other type of display unit could be used, for example a display that has a cathode ray tube (CRT) or LCD that is directly viewed by the driver. Other substitutions and alterations are also possible without departing from the spirit and scope of the present invention, as defined by the following claims.

Additionally, although computer 60 has been illustrated as being a separate component of the invention, computer 60 could be a part of camera unit 30, display unit 40, or any other component of an auxiliary vision system. Moreover, the functions of computer 60 could be incorporated into circuitry 38, circuitry 42, or any other circuitry of an auxiliary vision system.

What is claimed is:

1. A system for forming images for display in a vehicle, comprising:
   a lens system directing energy from a scene toward a detector;
   a display unit coupled to the detector, the display unit forming an image using information received from the detector;
   the detector including an array of detector elements, each detector element receiving energy from a portion of the scene and converting the received energy into information representative of the received energy, the detector sending the information associated with at least some of the detector elements to the display unit; and
   a computer coupled to the detector, the computer being configured to select a portion of the detector elements that should be used in forming an image based upon operating conditions of a vehicle, and instructing the detector which detector elements should have their associated information sent to the display unit.

2. The system of claim 1, wherein the computer is configured to use a direction of a roadway in selecting the portion of detector elements to be used in forming an image.

3. The system of claim 2, wherein the computer is configured to receive heading information from one or more sensors on the vehicle and to use the heading information to determine the direction of the roadway.

4. The system of claim 3, wherein the heading information comprises steering angle information from a first sensor on the vehicle and incline information from a second sensor on the vehicle.

5. The system of claim 4, wherein the first sensor comprises an angle decoder associated with a steering column for the vehicle and the second sensor comprises a inclinometer.

6. The system of claim 2, wherein the computer is further configured to process scene information from the detector elements in order to determine the direction of the roadway.

7. The system of claim 6, wherein the computer is configured to use information from all of the detector elements in order to process the scene information to determine the direction of the roadway.

8. The system of claim 6, wherein the computer is configured to use information from a portion of the detector elements in order to process the scene information to determine the direction of the roadway.

9. The system of claim 1, wherein the energy directed by the lens system toward each detector element has a size of approximately one and three-tenths milliradians.

10. The system of claim 1, wherein the lens system comprises an objective lens having a diameter of one and one-half inches, an effective focal length of one and one-half inches, and an optical speed of f/1.

11. The system of claim 1, wherein the display unit comprises a head-up display.

12. The system of claim 1, wherein the display unit comprises a direct view LCD display.

13. The system of claim 1, wherein the detector comprises an uncooled pyroelectric barium strontium titanate detector.

14. A method for forming images for display in a vehicle, comprising:
   directing energy from a scene toward a detector having a plurality of detector elements;
   receiving the energy from a portion of the scene at each of the plurality of detector elements;
   converting the energy received at each detector element into information representative of the received energy;
   selecting a portion of the detector elements to use in forming an image based upon operating conditions of a vehicle; and
   forming an image using the information associated with the selected portion of the detector elements.

15. The method of claim 14, wherein the selecting step comprises determining a direction of a roadway in order to select the portion of detector elements to be used in forming an image.

16. The method of claim 15, further comprising receiving heading information from one or more sensors on the vehicle and using the heading information to determine the direction of the roadway.

17. The method of claim 16, wherein the heading information comprises steering angle information from a first sensor on the vehicle and incline information from a second sensor on the vehicle.

18. The method of claim 15, further comprising processing scene information from a portion of the detector elements in order to determine the direction of the roadway.

19. The method of claim 15, further comprising processing scene information from all of the detector elements in order to determine the direction of the roadway.

20. The method of claim 14, further comprising utilizing a computer to instruct the detector to send information for the selected portion of the detector elements to a display in order to display the image.

21. The method of claim 20, further comprising utilizing the detector to interpolate information associated with the selected portion of the detector elements to produce additional information to be used in forming the image.

* * * * *